US008281683B2

(12) United States Patent
Garrec et al.

(10) Patent No.: US 8,281,683 B2
(45) Date of Patent: Oct. 9, 2012

(54) REMOTE MANIPULATION ARM IN TWO PORTIONS

(75) Inventors: Philippe Garrec, Gif sur Yvette (FR); Gérard Piolain, Octeville (FR)

(73) Assignee: Commissatiat a l'Energie Atomique (FR)

( * ) Notice: Subject to any disclaimer, the term of this patent is extended or adjusted under 35 U.S.C. 154(b) by 1359 days.

(21) Appl. No.: 10/589,799

(22) PCT Filed: Feb. 25, 2005

(86) PCT No.: PCT/FR2005/050128
§ 371 (c)(1),
(2), (4) Date: Sep. 20, 2007

(87) PCT Pub. No.: WO2005/084894
PCT Pub. Date: Sep. 15, 2005

(65) Prior Publication Data
US 2008/0014051 A1    Jan. 17, 2008

(30) Foreign Application Priority Data
Feb. 26, 2004    (FR) ..................................... 04 50358

(51) Int. Cl.
B25J 17/00    (2006.01)
B25J 17/02    (2006.01)
B25J 18/00    (2006.01)
B25J 3/04    (2006.01)
(52) U.S. Cl. .................. 74/490.02; 74/490.01; 74/490.3; 74/490.04; 74/490.05; 414/5; 414/7
(58) Field of Classification Search ................ 74/421 A, 74/490.01, 490.03, 490.04, 490.05, 491; 414/909, 3–8
See application file for complete search history.

(56) References Cited

U.S. PATENT DOCUMENTS

| 3,261,480 | A | * | 7/1966 | Haaker et al. ..................... 414/7 |
| 3,295,389 | A | | 1/1967 | Wallschmiller | |
| 3,428,189 | A | | 2/1969 | Ainsworth | |
| 3,815,761 | A | * | 6/1974 | Adam ............................... 414/6 |
| 4,221,516 | A | * | 9/1980 | Haaker et al. ..................... 414/5 |

(Continued)

FOREIGN PATENT DOCUMENTS

| FR | 2 667 532 A | 4/1992 |
| JP | 50-39775 | 12/1975 |
| JP | 03-104572 | 5/1991 |

OTHER PUBLICATIONS

Machine Translation of FR 2667532, Gerard, Apr. 10, 1992.*
Search Report which issued in corresponding PCT application FR2005/050128.

*Primary Examiner* — Vinh T. Luong
(74) *Attorney, Agent, or Firm* — Baker & Hostetler LLP

(57)    ABSTRACT

A remote manipulation arm comprising a master arm (5) mechanically separated from a slave arm (1) with the slave arm comprising a tubular segment and a manipulation tool 12 at one end thereof and further comprising an interface system including a control portion (7) and a mechanical power portion (8) for driving the slave arm (1) through a mechanical transmission (26,27) of the slave arm wherein the mechanical power portion (8) comprises a stationary motor, a stationary casing, a drum attached to the tubular segment and a transmission capable of rotating the tubular segment (3) and wherein the remote manipulation arm further comprises a winder (32) of electrical cables leading to control motors and a circular arc shaped part between the drum and a cylindrical portion of the stationary casing.

13 Claims, 4 Drawing Sheets

Figure 1:
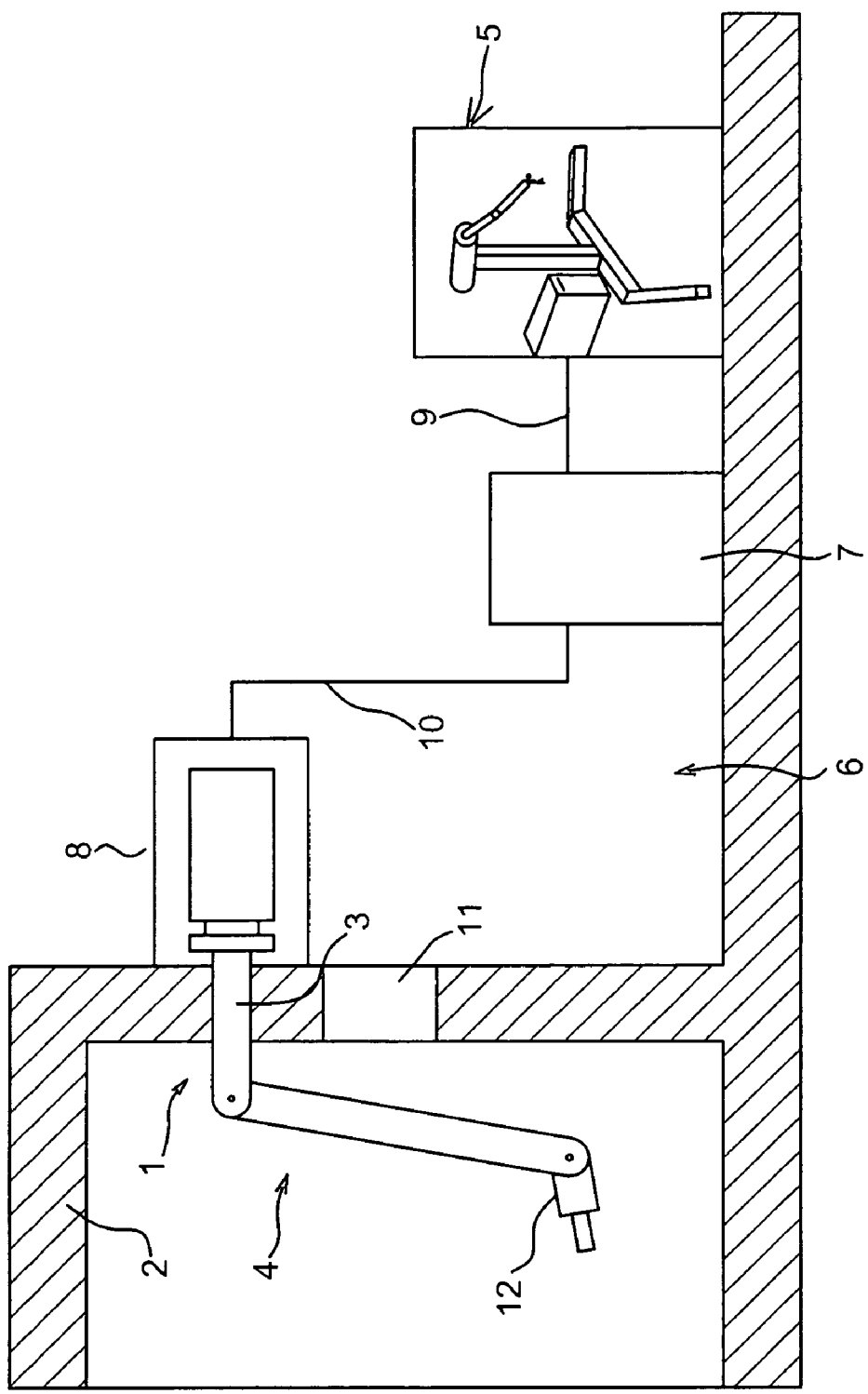

U.S. PATENT DOCUMENTS 5,828,813 A * 10/1998 Ohm .............................. 700/260
7,474,198 B2 * 1/2009 Gosselin et al. ........... 340/407.1
2004/0250644 A1 * 12/2004 Gosselin et al. ........... 74/490.04

* cited by examiner

REMOTE MANIPULATION ARM IN TWO PORTIONS

FIELD OF THE INVENTION

The subject of this invention is a remote manipulation arm comprising a master arm and a slave arm in two separate portions.

BACKGROUND OF THE INVENTION

A remote manipulation arm uses a master arm and a slave arm, when working in a hostile medium in addition to mechanical transmission for connecting joints of the segments of the master arm to those of the slave arm in order to provide control over the movement of the master arm as imposed by an operator, so that it is reproduced by the slave arm. One end of the master arm is held by the operator and another end of the slave arm comprises a manipulation tool.

The remote manipulation arm is generally in a single piece with the master arm being directly connected to the slave arm so that mechanical transmission is continuous. A prior art design is disclosed in French Patent 2 667 532 using a slave arm without a master arm being controlled by a device with buttons or a similar implement, in which the controls are converted into electric signals delivered by a control system in which motors control the transmission of the slave arm according to these electric signals. This allows for control over the slave arm in a different more accurate manner. Another feature of this system is that the forces in the slave arm, due to gravity or to the undertaken work, are no longer transmitted to the operator. This reduces operator fatigue but, it should be noted that, on the contrary, it does not provide the operator with a "feel" proportional to that experienced by the tool for improving the quality of the control. So-called force feedback devices are added for producing the desired reactions in the master arm. No such reaction may be produced according to this U.S. Pat. No. 2,667,532.

Prior art remote manipulation arms generally have limited movements. In this way the pivoting movement of a tubular segment, a so-called crossing segment, engaged through a protective wall and mounted on rolling bearings, is reduced by having the master arm pivot upwards. This can only be performed by a small angle, as too high an elevation would no longer allow the operator to suitably hold the master arm and with the pivoting of the master arm accompanied with corresponding pivoting of the slave arm causing the weight to produce an antagonist moment to the elevation which hinders the operator. Counterweights reduce the pivoting moment but their action remains incomplete in practice. In spite of their possibilities, the slave arms are therefore associated with reduced work space and especially with a low height. The aforementioned patent does not find a remedy to this insufficiency. Instead, it suggests having the slave arm pivot by a transversely positioned cylinder which only authorizes a small motion angle.

The most important object of the subject invention is therefore to increase the possibilities of movement in a remote manipulation arm preferably by raising the level where the slave arm may be placed and without causing any difficulty to the operator.

BRIEF SUMMARY OF THE INVENTION

In accordance with the remote manipulator arm of the subject invention, the master arm and the slave arm are separated into two portions to permit the slave arm to perform large rotations without giving up the benefits of control through a manual movement associated with force feedback to the operator.

Broadly, the invention relates to a remote manipulator arm comprising a master arm (5) handled by an operator, a slave arm (1) comprising a first, tubular segment (3) engaged through a wall (2) and other segments ending on a manipulation tool (12), said segments forming a jointed train (4), characterized in that the master arm and the slave arm are without any direct mechanical transmission linking them but are provided with an interface system comprising a control portion (7) and a power portion (8), the power portion being coupled with the tubular segment (3) and comprising motors (24, 25) for controlling mechanical transmissions (26, 27) included in the slave arm (1), a winder (32) of electrical cables leading to the motors and with the control portion (7) controlling the motors in response to indications of movement accomplished on the master arm, the power portion comprises a stationary casing (13), a drum (14) rotatably mounted in the casing and attached to the tubular segment (3), a stationary motor (15) and a transmission (16), comprising a crown around the drum (14) and a member (21) for engaging with the crown (22), and connecting the drum to the stationary motor wherein the winder (32) comprises a free circular-arc-shaped part (34) between the drum (14) and a cylindrical portion of the casing (13), the electrical cables (36) being attached to a point of the drum and to a point of said cylindrical portion.

Figure 2:
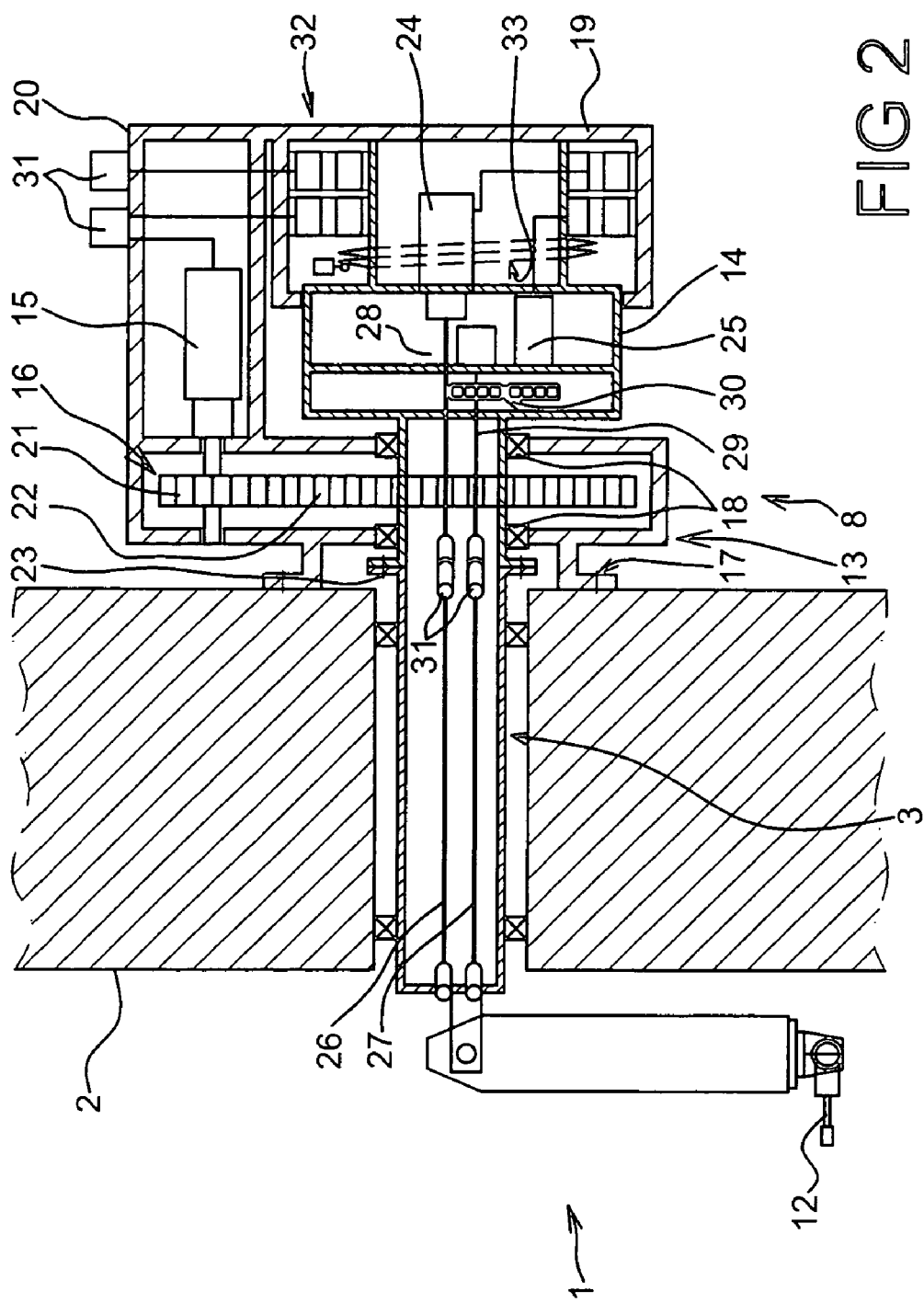
Figure 3:
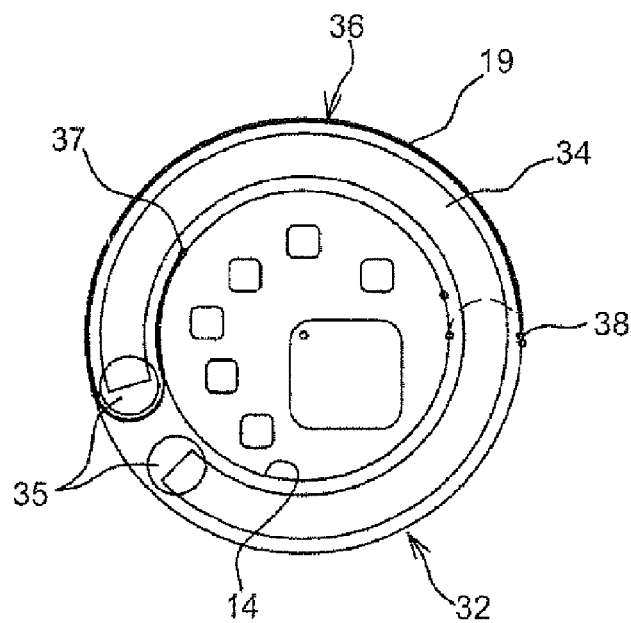
Figure 4:
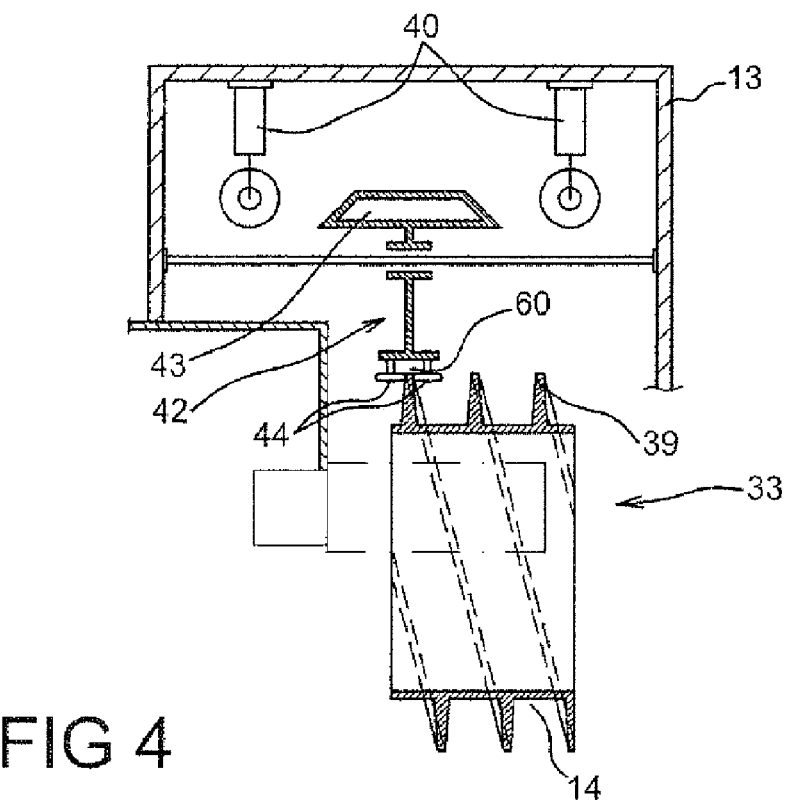
Figure 5:
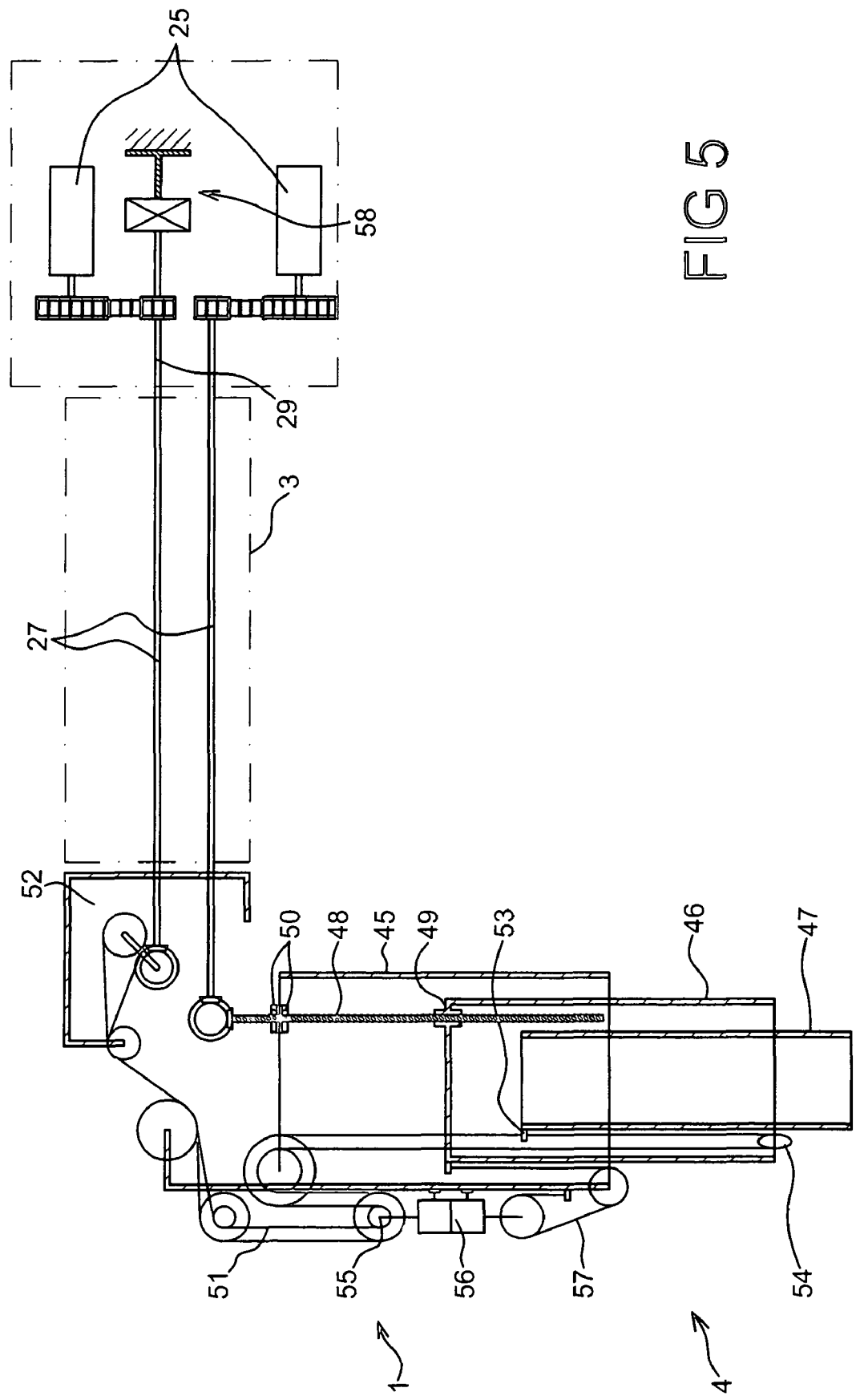

These objects of the invention as well as other ones will be now described in connection with the figures:

FIG. 1 illustrates the general aspect of the invention;
FIG. 2 illustrates the system for driving the slave arm;
FIG. 3 illustrates another aspect of the invention;
FIG. 4 illustrates yet another aspect of the invention; and
FIG. 5 illustrates yet a further aspect of the invention.

FIG. 1 teaches a slave arm 1 comprising a first, tubular segment 3, engaged through a protective wall 2, and a train 4 of other segments jointed with each other and with the tubular segment 3 and located beyond the protective wall 2 in the hostile work medium; a master arm 5 positioned at a certain distance from the slave arm 1; and an interface system 6 consisting of a control portion 7 and an power portion 8 attached to the protective wall 2 and linked to the tubular segment 3. Electric lines 9 and 10 connect the control portion 7 to the slave arm 1 and to the power portion 8 for controlling the latter according to the movements of the slave arm 1. Finally, with a window 11 the operator holding the master arm 5 may observe the effect of his/her action on the slave arm 1 and the tool 12 (often a grip).

FIG. 2 is referred to for a main view of the most remarkable part of the invention, i.e., the power portion 8. It basically comprises a stationary casing 13, a drum 14 rotating in the casing 13, a stationary motor 15 for driving 2 the drum 14 and a gear transmission 16 providing this drive, which comprises a pinion on the output shaft of the motor 15 and a crown on the drum 14. The pinion may mesh with the crown or be connected to it through a synchronous belt or another means. The casing 13 is mounted on the protective wall 2 through an anchoring device 17. The drum 14 is supported by the casing 13 by means of bearings 18 which allow it to rotate, and it extends at least partly in a cylindrical portion 19 of the casing 13. The motor 15 extends in another portion 20 of the casing 13 and is fixed therein. The transmission 16 comprises a pinion 21 attached to the output shaft of the motor 15 and a crown 22 meshing with the pinion 21, surrounding a portion of the drum 14. With this system, it is possible to rotate the drum 14 by a full turn, and more, around an axis coinciding with that of the tubular segment 3, which is adjacent to the end of the drum 14 and in its extension. The complete link may be established by screwing contacting brackets 23 belonging to both of these parts. The rotation of the drum 14 therefore causes rotation of the tubular segment 3 as well as that of the whole slave arm 1.

The drum 14 contains a certain number of control motors, among which a central motor 24 may be distinguished, the other ones (six in number, but only one being illustrated here) being side motors 25. Each of these control motors 24 and 25 is associated with a transmission extending in the slave arm 1 for controlling a segment of the train 4 and which typically comprises a transmission bar in the tubular segment 3. The bar associated with the central control motor 24 bears reference 26, and the bars associated with the other control motors 25 bear reference 27 (here, only one is illustrated). The bar 26 is extended into the drum 14 through an output shaft 28 of the motor 24, and the bars 27, through shafts 29 are driven by the control side motors 25 via synchronous belt transmissions 30 which allow the corresponding control side motors 25 to be moved close to the periphery of the drum 14 so that they only allow very small play. The bars 26 and 27 are joined to the shafts 28 and 29 by bolt couplings 31 or other couplings. The bar 26 is intended to tilt the segment jointed with the tubular segment 3, and also the remainder of the train 4, in a vertical direction, which may produce a significant reactive moment due to gravity and imposes suitable power to the control motor 24 and suitable resistance of the mechanical transmission, whereas the forces being exerted on the bars 27, the shafts 29 and the side motors 25 are much less significant, so that fragile transmissions 30 may be used. Also, the pivoting of the tubular segment 3 requires that it should withstand a large force, which justifies the use of a resistant gear transmission 16.

The electric connectors 31 which receive the wires of the line 10 and which are placed on the casing 13, a cable winder device 32 with which the control motors 24 and 25 may be suitably powered electrically, and an end-of-travel device 33 are further illustrated. The last two devices will now be described with the help of the following figures.

FIG. 3 illustrates the cable winder 32. It is positioned in an annular space between the cylindrical portion 19 containing the drum 14 and the drum 14 itself, and it mainly consists in a circular-arc shaped part 34 freely mounted in this space and at least the ends of which are provided with rollers 35. Further, the cables 36 for connecting to the drum 14 have a point 37 for attachment to the drum 14 and a point 38 for attachment to the casing 13. Their extension is a little more than a circumference of the drum 14. The operation of the features of the remote manipulation arm may be summarized in this way: the slave arm 1 and notably the tubular segment 3 should rotate corresponding in all angular positions with displacements of one turn being sufficient for adjustment of the tool 12 into all of the possible positions, but with a little larger angular travel being required for absorbing the braking of the arm and for triggering the end-of-travel devices. The circular-arc-shaped part 14 distributes the length of the cables 36 in an external strand close to the cylindrical portion 19 and an internal strand close to the drum 14 on either side of one of the rollers 35. This is located here at an end position of the drum 14. By displacing the latter clockwise, the internal strand of the cables 36 is drawn while reducing the length of the external strand and by rotating the circular-arc-shaped part 34. Rotation is allowed until the external strand has disappeared. A suitable position of the cables 36 remains guaranteed by the circular-arc-shaped part 34 which is used as a spacer in any position. The drum 14 may be rotated by one turn and more, without mishap and with little friction. In practice, the cables are placed in a protective chain near its average radius of curvature so as to minimize the friction of the cables on each other.

FIG. 4 illustrates the end-of-travel device 33. A helix 39 is positioned at the periphery of the drum 14. Two end-of-travel contacts 40 are mounted on the casing 13. A slide 41 is also mounted on the casing 13 and bears a carriage 42 which slides on it. The carriage 42 comprises a mobile portion represented by a cam 43 which may come into abutment with the end-of-travel contacts 40 and a pair of rollers 44 encircling the helix 39 and forming a groove 60 of the carriage into which it engages. The rotation of the drum 14 causes the helix 39 to move past between the rollers 44 while displacing them, as well as the remainder of the carriage 42, the slide being parallel to the axis of rotation of the drum 14 and to that of the helix 39. When the cam 43 touches the end-of-travel contacts 40, stopping the movement of the drum 14 is imposed. The end-of-travel contacts 40 are connected to the control portion 7 by electrical lines not shown, for signaling these states. The method provides protection of the winder over its angular rotational travel.

A particular enhancement is illustrated by means of FIG. 5 using slave arms which are characterized in that the last segments of the train 4 are sliding segments, in order to vary the length of the slave arm 1 rather than rotating segments corresponding to three end segments 45, 46 and 47, respectively. The transmission permitting the middle segment 46 to be adjusted relative to the preceding segment 45 comprises a worm screw 48 positioned through a tapped bushing 49 attached to the middle segment 46. The worm screw 48 is retained in a fixed position relative to the preceding segment 45 by flanges 50 and is driven into rotation by gear means. The gear means has an angle transmission with a transmission bar, etc., passing through the front segments and ending with one of the transmission bars and one of the control motors 25. As the structure of this arm is known, we have only partly illustrated its structure and transmission. The same applies to the transmission for controlling the movement of the end segment 47. We shall merely point out that it comprises a double strand cable component 51, the strands ending up at a pair of pulleys 52 driven by a same control bar 27, respectively. They end up at their opposite end, in a common point of attachment 53 on the end segment 47, one of them further passing through a deflection pulley 54 attached to the bottom of the middle segment 46. As the strands are wound on the pulleys 52 in opposite directions, rotation of the bar 27 unwinds one of them and winds the other one, so that they cooperate in opening out and retracting the end segment 47 in the middle segment 46. It should be noted that rotation of the worm screw 48 not only displaces the middle segment 46 but also the end segment 47, since the strands of the cable 51 also pass through another deflection pulley 55 integral with a carriage 56 mounted on the previous segment 45 and which is connected to the middle segment 46 through another cable 57. A displacement of the middle segment 46, downwards, for example slackens the cable 57, which allows the carriage 56 to be raised along the previous segment 45 by half displacement, each of the strands of the cable is slackened by the half displacement on either side of the deflection pulley 55, and the end segment 47 moves down by the same amount as the middle segment 46.

The worm screw transmission 48 is robust, but not that of the cable 51. It happens that the segments of the train 4 have to withstand a significant force, such as a heavy load. Blocking the movement of the cable 51 and only resorting to the movement allowed by the worm screw 48 is achieved by a mechanical brake 58 blocking the rotation of the shaft 29 associated with the cable transmission 51, which may consist of a friction disk or a mobile jaw clutch. The associated motor 25 and transmission 30 are relieved from the force experienced by the control bar 27.

A suitable master arm 5 may be the one developed by Haption under reference Virtuose 6D 4040. Its force capacity is limited to 4 kilograms. Its friction (relatively to its capacity) is comparable to that of the slave arm 1 and to that of a conventional remote manipulator. It should also be noted that the control portion 7 may also operate with force feedback, i.e., record the forces experienced by the slave arm 1 by means of the forces which the control motors must provide, or by suitable sensors placed on the motors or the transmissions, and make the operator feel them, by creating forces in motors of the master arm. However, it is understood that the separation of the master arm 5 and the slave arm 1 will allow the master arm 5 to be controlled more easily, with reduced forces allowing the operator to use both arms together, one in each hand, which gives the operator much more significant working possibilities than with the generally tiresome arms known today. Another control mode may be adapted in which a single master arm and an operator may himself/herself control two slave arms of the work station so that the force capacity may in particular be doubled and significant torques may be developed by acting in opposition on a part in two points spaced apart. Finally, it is noted that balancing of the slave arm 1 may advantageously be performed accurately by means of the software control which may calculate the torques and forces due to gravity. If need be, balancing by a counterweight will be much easier to achieve in the absence of a master arm which is mechanically connected to it.

The invention claimed is:

1. A remote manipulation arm, comprising a master arm (5) handled by an operator, a slave arm (1) comprising a first, tubular segment (3) engaged through a wall (2) and other segments ending on a manipulation tool (12), said segments forming a jointed train (4), characterized in that the master arm and the slave arm are without any direct mechanical transmission linking the master arm and the slave arm but are provided with an interface system comprising a control portion (7) and a power portion (8), the power portion being coupled with the tubular segment (3) and comprising motors (24, 25) for controlling mechanical transmissions (26, 27) included in the slave arm (1), a winder (32) of electrical cables leading to the motors and with the control portion (7) controlling the motors in response to indications of movement accomplished on the master arm, the power portion comprises a stationary casing (13), a drum (14) rotatably mounted in the casing and attached to the tubular segment (3), a stationary motor (15) and a transmission (16), comprising a crown around the drum (14) and a member (21) for engaging with the crown (22), and connecting the drum to the stationary motor wherein the winder (32) comprises a free circular-arc-shaped part (34) between the drum (14) and a cylindrical portion of the casing (13), the electrical cables (36) being attached to a point of the drum and to a point of said cylindrical portion.

2. The remote manipulator arm according to claim 1, further characterized by an end-of-travel device (33) for the drum, comprising stationary portions (40) and mobile portions (43) mounted on a sliding carriage (42), and a helix (39) attached to the drum and engaging into a groove (60) of the carriage.

3. The remote manipulator arm according to claim 2, characterized in that one (26) of the mechanical transmissions included in the slave arm, which drives into rotation one of the segments of the train, which is adjacent to the tubular segment (3), and the control motor (24) which drives said mechanical transmission, are placed along an axis of rotation of the tubular segment (3).

4. The remote manipulator arm according to claim 2, characterized in that two of the segments (46, 47) of the train are subject to sliding movements by two of the mechanical transmissions, one of which comprises a cable (51) and the other comprises a worm screw (48), and in that a mechanical blocker (58) of the transmission comprising the cable is provided in the power portion of the interface system.

5. The remote manipulator arm according to claim 1, characterized in that one (26) of the mechanical transmissions included in the slave arm, which drives into rotation one of the segments of the train, which is adjacent to the tubular segment (3), and the control motor (24) which drives said mechanical transmission, are placed along an axis of rotation of the tubular segment (3).

6. The remote manipulator arm according to claim 5, further characterized by an end-of-travel device (33) for the drum, comprising stationary portions (40) and mobile portions (43) mounted on a sliding carriage (42), and a helix (39) attached to the drum and engaging into a groove (60) of the carriage.

7. The remote manipulator arm according to claim 6, characterized in that two of the segments (46, 47) of the train are subject to sliding movements by two of the mechanical transmissions, one of which comprises a cable (51) and the other comprises a worm screw (48), and in that a mechanical blocker (58) of the transmission comprising the cable is provided in the power portion of the interface system.

8. The remote manipulator arm according to claim 1, characterized in that two of the segments (46, 47) of the train are subject to sliding movements by two of the mechanical transmissions, one of which comprises a cable (51) and the other comprises a worm screw (48), and in that a mechanical blocker (58) of the transmission comprising the cable is provided in the power portion of the interface system.

9. The remote manipulator arm according to claim 8, further characterized by an end-of-travel device (33) for the drum, comprising stationary portions (40) and mobile portions (43) mounted on a sliding carriage (42), and a helix (39) attached to the drum and engaging into a groove (60) of the carriage.

10. The remote manipulator arm according to claim 9, characterized in that one (26) of the mechanical transmissions included in the slave arm, which drives into rotation one of the segments of the train, which is adjacent to the tubular segment, and the control motor (24) which drives said mechanical transmission, are placed along an axis of rotation of the tubular segment.

11. The remote manipulator arm according to claim 9, characterized in that two of the segments (46, 47) of the train are subject to sliding movements by two of the mechanical transmissions, one of which comprises a cable (51) and the other comprises a worm screw (48), and in that a mechanical blocker (58) of the transmission comprising the cable is provided in the power portion of the interface system.

12. The remote manipulator arm according to claim 8, characterized in that one (26) of the mechanical transmissions included in the slave arm, which drives into rotation one of the segments of the train, which is adjacent to the tubular segment, and the control motor (24) which drives said mechanical transmission, are placed along an axis of rotation of the tubular segment.

13. The remote manipulator arm according to claim 5, characterized in that two of the segments (46, 47) of the train are subject to sliding movements by two of the mechanical transmissions, one of which comprises a cable and the other comprises a worm screw, and in that a mechanical blocker (58) of the transmission comprising the cable is provided in the power portion of the interface system.

* * * * *

UNITED STATES PATENT AND TRADEMARK OFFICE
CERTIFICATE OF CORRECTION

PATENT NO. : 8,281,683 B2
APPLICATION NO. : 10/589799
DATED : October 9, 2012
INVENTOR(S) : Garrec et al.

It is certified that error appears in the above-identified patent and that said Letters Patent is hereby corrected as shown below:

Title page item (73), should read:

Assignees: 1) Commissariat A L'Energie Atomique
Paris, France; and
2) Compagnie Generale Des Matieres Nucleaires
Velizyvillacoublay, France Signed and Sealed this
Twenty-second Day of October, 2013

Teresa Stanek Rea
*Deputy Director of the United States Patent and Trademark Office*